June 18, 1929.  E. B. BOUGHTON  1,718,108
BRAKING MECHANISM FOR AERIAL MACHINES
Filed May 26, 1928   2 Sheets-Sheet 2
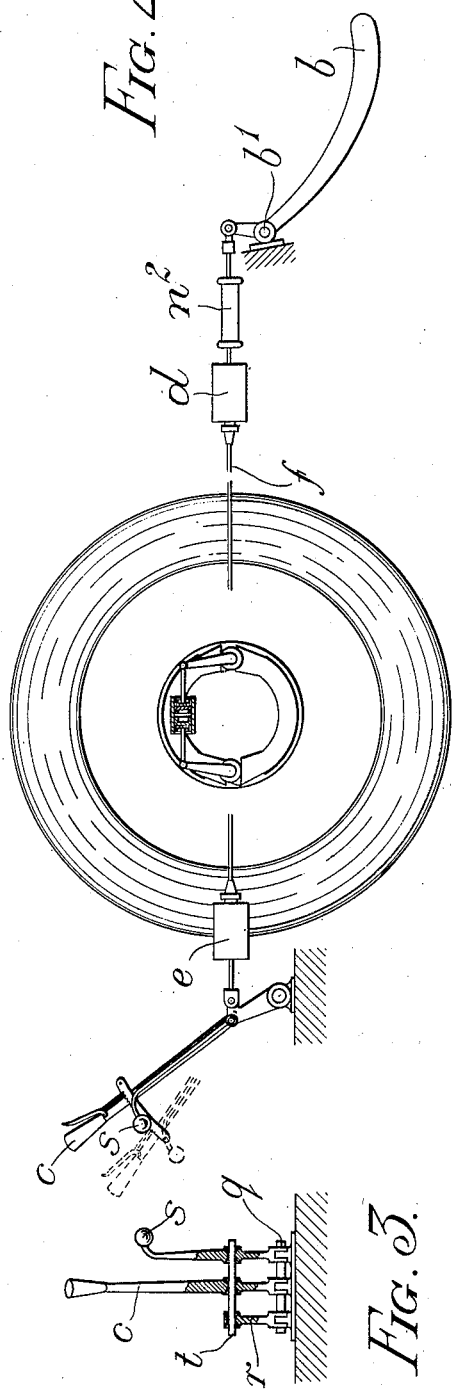
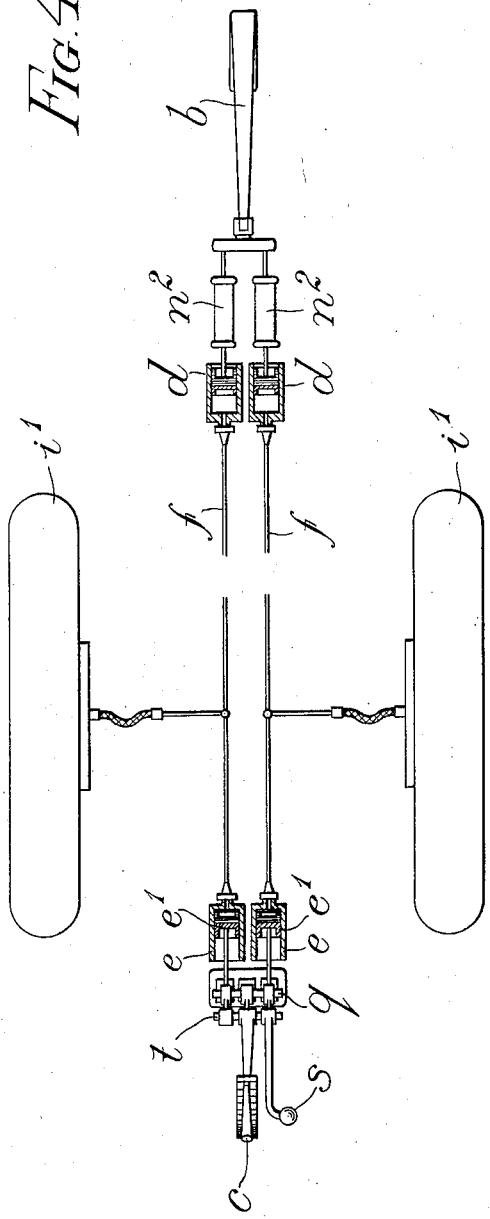
Inventor
E. B. Boughton Patented June 18, 1929.

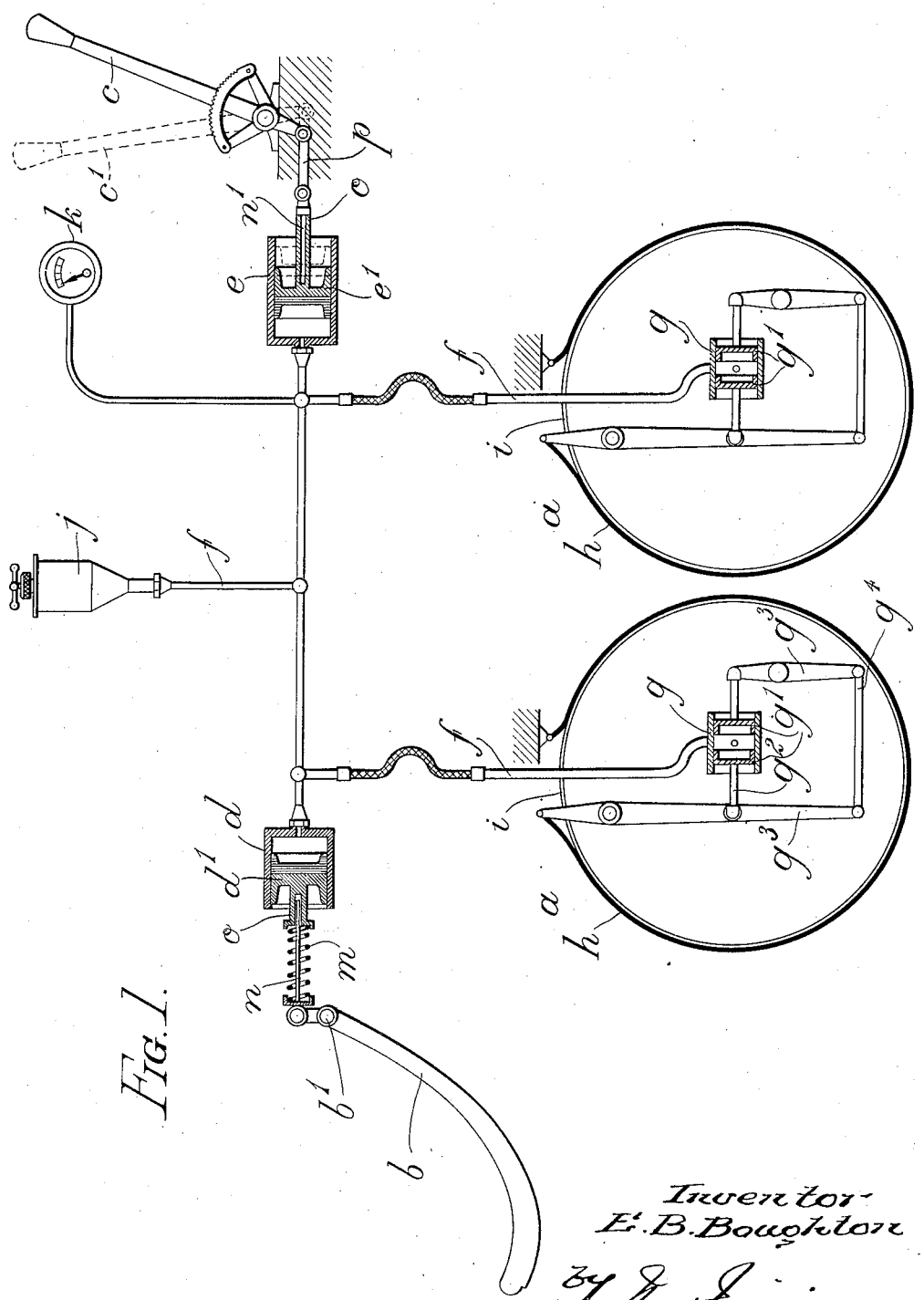

1,718,108

UNITED STATES PATENT OFFICE.

EDWARD BISHOP BOUGHTON, OF LONDON, ENGLAND.

BRAKING MECHANISM FOR AERIAL MACHINES.

Application filed May 26, 1928, Serial No. 280,905, and in Great Britain May 6, 1927.

This invention refers to improvements in or relating to braking mechanism for aerial machines with or without aerostats, though it has more particular reference to machines of the aeroplane type.

The object of the present invention is to provide an improved arrangement for automatically and/or manually braking such machines and also a means for enabling same to be controlled by the pilot.

Now according to the present invention I provide braking mechanism for aerial machines in which the brake is applied automatically when the tail skid or its equivalent part of the machine comes into contact with the ground.

In order that the present invention may be clearly understood and more readily carried into effect, it is hereinafter described with reference to the accompanying drawings, in which:—

Figure 1 is a diagram showing the improved braking mechanism arranged in connection with a hydraulic transmission system;

Figure 2 is a substantially similar view illustrating in addition means whereby the braking effect may be varied upon the two wheels thus enabling the machine to be turned or steered when landing or "taking off";

Figure 3 is a detail view of the operating levers, and

Figure 4 is a plan view corresponding to Figure 2.

As shown and in carrying the invention into effect, the brakes $a$ which may conveniently be arranged in connection with the running wheels of the aeroplane, are adapted to be operated or applied automatically by means of the tail skid $b$ or some equivalent portion of the aeroplane which makes contact with the ground and/or by the pilot, as from a hand lever $c$, and through the intermediary of suitable transmission mechanism which may be hydraulic or mechanical, the former method being preferred. Thus on the machine landing the aforesaid tail skid $b$ or other suitable part coming in contact with the ground serves to apply the brake and by this means in the event of the braking effort affecting the fore and aft stability of the plane, the brake is automatically released as the tail lifts from the ground. The braking mechanism of the present invention as applied by means of a hydraulic transmission system comprises a master or brake operating cylinder $d$ and piston $d'$ controlled as desired by the tail skid or lever $b$ fulcrumed at $b'$, a second master or brake operating cylinder $e$, and piston $e'$, connected in circuit $f$ therewith and controlled at will by the pilot of the machine as by means of the ratchet hand lever $c$, one or more wheel cylinders $g$ attached to the wheel axles and operating by their pistons $g'$ brake bands or shoes $h$ or the like acting on drums $i$, attached to the road wheels or elsewhere a supply tank or reservoir $j$ for feeding the hydraulic system $f$, and a pressure gauge $k$ or its equivalent indicator connected to the system in view of the pilot for indicating the actual or comparative amount of braking effect.

In use the method of operating the brake is as follows:—

The piston $e'$ of the second master cylinder $e$ controlled by the pilot is operated, as by the hand lever $c$, which has certain definite positions, as indicated in dotted lines at $c'$, for when the brake is fully off and inoperative, and, as indicated in full lines at $c$, for when the brake bands are in contact with their drums under a light pressure. This latter pressure can be regulated to any amount desired by the pilot, as indicated by the aforesaid pressure gauge $k$, this position and condition ensuring that all clearance between the bands $h$ and the drums $i$ is taken up before the machine lands, thereby ensuring that no lost movement is entailed in operating the brakes $a$ when the piston $d'$ of the main operating cylinder $d$ is moved to apply the brakes as when the tail skid $b$ comes in contact with the ground. This arrangement also enables the maximum braking effect to be obtained or limited by the pilot to any predetermined amount.

When landing and wishing to brake the machine the pilot puts the lever $c$ into the required position, pushes the piston $e'$ in so as to either take up all clearance and lost motion without producing any definite braking effect when the landing wheels touch the ground until the tail skid $b$ comes into contact with the ground and operates the brake as required, or, so as to increase the said clearance and lost motion and limit the maximum braking effect. When the tail skid $b$ touches the ground on landing, this immediately, or after a predetermined amount of movement has been imparted to it, operates or pushes in the piston $d'$ in the main master cylinder $d$ and applies pressure to the brakes to the maximum predetermined amount through the medium of the wheel cylinders $g$ operating on the brake bands or shoes $h$, as through the intermediate pistons $g'$, rods $g^2$, levers $g^3$, and link $g^4$.

In the event of the pilot requiring to land without braking the machine, such as when landing on very rough ground, he puts the pilot brake lever $c$ connected with the second master cylinder $e$ into the inoperative or dotted-line position $c'$ so that when the machine lands and the tail skid $b$ touches the ground and operates the main master cylinder the hydraulic medium is simply displaced out of the main master cylinder $d$ and into the second master cylinder $e$ without causing any pressure in the system and therefore does not operate the brakes.

The manner and extent to which the movement of the tail skid $b$ automatically operates or applies the brakes can also be set or regulated at will from time to time, apart altogether from the variable control obtainable by adjusting the hand lever $c$, by the insertion in the system of a suitable elastic compensating or lost motion device adapted to set a limit to the braking effect obtainable when the brake is applied and also to determine the position during its angular movement at which the said tail skid commences to apply the brake.

The control of the main master cylinder $d$ by the tail skid $b$ may thus be arranged, as indicated, through a purely mechanical elastic compensating or lost motion device such as an adjustable compression spring $m$ arranged in connection with two telescopic members $n$, $o$, so that the movement of the tail skid $b$ is more or less unrestricted and the movement of the piston $d'$ in the master cylinder $d$ and the pressure on same is in accordance with that required to obtain the necessary braking effect, the spring only coming into operation to exert pressure on the piston $d'$ after all the lost motion has been taken up. Alternatively the spring $m$ or lost motion device can be placed between the piston $e'$ in the second master cylinder $e$ and the pilot's brake lever $c$. In the particular construction illustrated, the hand lever $c$ is connected to the piston $e$ by means of a link $p$ and telescopic members $n'$, $o'$.

The same method can be employed for a purely mechanical braking system, but in this instance no pressure indicator would be inserted in the system as the pilot would "feel" the amount of pressure for brake contact.

In some cases it may also be desired at times to increase the braking effect on one wheel and to reduce the braking effect on the other wheel, for the purpose of enabling the machine to be turned. This may be accomplished by the provision of twin transmission systems $f$ and of twin master cylinders $d$ and $e$ at rear and front. Both these rear master cylinders $d$, $d$, are adapted to be jointly operated by the tail skid $b$ through spring-loaded lost motion or pressure-controlling devices $n^2$ conveniently of the kind described with reference to Figure 1 so as to be adjustable for controlling the pressure applied to the system by the tail skid and for contact with different positions of the tail skid. The front twin master cylinders $e$, $e$ are adapted to be operated by the pilot through a compensating system of linkage, allowing either equal or unequal pressure on each brake drum $i$ as desired for steering purposes. This linkage system comprises as before, a simple ratchet hand lever $c$ for use by the pilot when it is desired to brake equally on both wheels $i'$. This lever $c$ is fulcrumed at its base on a pivot bar $q$ which is also common to a link $r$ and an additional steering lever $s$. The hand levers $c$ and $s$ and the link $r$ are also connected by a common rod $t$. Thus as the hand lever $c$ is arranged at a point midway between the members $r$ and $s$ which are connected to the pistons $e'$, $e'$ by the links $p$, it will move or apply pressure to both the said pistons $e'$, $e'$ equally when actuated and as so used will also brake both wheels $i'$ equally. For steering purposes the auxiliary lever $s$ is also adapted so that pressure applied to same in one direction or the other will either increase or decrease the pressures acting on the cylinders $e$ so that the pressure on one side is greater or less than the pressure on the other so causing a difference in the amount of the braking effect on the wheels and thereby causing the machine to tend to giving over towards the side whose wheel has the greatest braking effect. In Figure 2 the brakes shown are of the expanding segment type, though it will be understood that they may equally well be of the band type shown in Figure 1 or of any other kind.

This mounting of the levers $c$ and $s$ and link $r$ is clearly shown in Figure 3 of the drawings. The levers and link are mounted on a common fulcrum point at their lower ends and are connected above the fulcrum point by a rod $t$ which extends through double conical or comparatively free holes in the levers and link. The hand lever $c$, if positioned midway between the lever $s$ and link $r$, applies equal pressure to both pistons $e'$. If the hand lever $c$ is moved to one side or the other of the center, it is obvious the leverage on the rod $t$ is altered and the pistons will be subjected to different pressures in the movement of the hand lever $c$. The different movements of the respective ends of the rod $t$ when the hand lever $c$ is shifted to one side or the other is permitted by the double conical openings in the respective parts for receiving the rod *t*. A similar effect for steering purposes can be obtained by holding the hand lever *c* and operating the auxiliary lever *s*, rocking the rod *t* in its fulcrum point in the central lever *c*, though in practice it is preferred that the brakes should be applied by means of the lever *c* and the relative pressures in the respective cylinders controlled by moving the lever *s* in one direction or the other.

It will be obvious that in place of the auxiliary steering lever, *s* a similar differential movement and pressure can be obtained by mounting the hand lever *c* so that it can be moved to one or other side of its mid position, in which case the operation of the said hand lever *c* will cause unequal movement and pressure to be given to the pistons in the master cylinders.

What I claim is:—

1. A braking system for aerial machines, including independent braking elements, a hydraulic system for each element including a hydraulic medium operating the element through the pressure thereon, a cylinder in each system open to the hydraulic medium, a plunger in each cylinder for varying the pressure on the medium in the system, an element carried by the aerial machine to be operated by the landing surface, a connection between said element and both plungers, a second cylinder in each system open to the hydraulic medium thereof, a plunger in each of said second cylinders for controlling the extent to which the cylinder is open to the hydraulic medium, and a manually operable element for actuating said last named plungers to provide compensation for the pressure exerted by the first named plungers, said manually operable element being capable of selectively varying the movement of the respective plungers in said second cylinders, whereby to vary the effect of the hydraulic medium on the respective braking elements.

2. A braking system for aerial machines, including independent braking elements, a hydraulic system for each element including a hydraulic medium operating the element through the pressure thereon, a cylinder in each system open to the hydraulic medium, a plunger in each cylinder for varying the pressure on the medium in the system, an element carried by the aerial machine to be operated by the landing surface, a connection between said element and both plungers, a second cylinder in each system open to the hydraulic medium thereof, a plunger in each of said second cylinders for controlling the extent to which the cylinder is open to the hydraulic medium, a member connected to each of said plungers and mounted for pivotal movement, a rod mounted in the upper ends of the members, said rod being permitted an angular play in each of the members while maintaining operative connection therewith, a manually operable lever cooperating with the rod for simultaneously operating the members in the same direction, and means including a manually operable element for differentially operating said members.

In testimony whereof I have hereunto signed my name.

EDWARD BISHOP BOUGHTON.